Nov. 24, 1931.   P. BROSSE   1,833,634
DEVICE FOR PROJECTING AND REPRODUCING FILMS

Filed Dec. 11, 1928

INVENTOR
Paul Brosse
BY
Gifford, Scull & Burgess
ATTORNEYS.

Patented Nov. 24, 1931

1,833,634

UNITED STATES PATENT OFFICE

PAUL BROSSE, OF NEUILLY, FRANCE, ASSIGNOR, BY MESNE ASSIGNMENTS, TO KISLYN CORPORATION, OF NEW YORK, N. Y., A CORPORATION OF DELAWARE

DEVICE FOR PROJECTING AND REPRODUCING FILMS

Application filed December 11, 1928, Serial No. 325,360, and in France December 31, 1927.

The present invention relates to an arrangement for reproducing colored pictures on lenticular films by projection-printing on sensitive lenticular film material with the elimnation of color stripes.

The arrangement according to the present invention consists in interposing between the objective and the sensitive lenticular film a diffraction system such as a screen having alternate opaque and transparent bands, and in displacing the diffraction system parallel to itself until the image of the network of the original film disappears on the plane of the sensitive film.

The simplest among the diffraction systems which may be used is a diffraction grating or screen having alternate opaque and transparent narrow bands, but any other convenient diffraction device may be employed. A screen having alternate opaque and transparent bands, however, has the advantage that diffraction is produced perpendicularly to the bands of the screen only, and that, therefore, the sharpness of the image is not affected in a direction parallel to the said bands.

Figure 1:
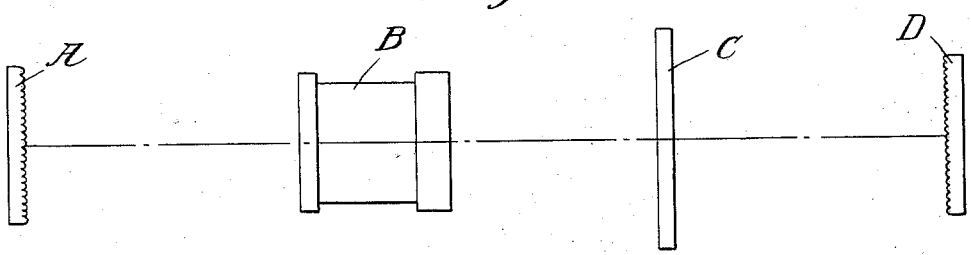
Figure 2:
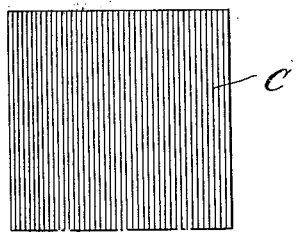

Figure 1 of the accompanying drawings illustrates diagrammatically in plan, a suitable arrangement of the diffraction device in a reproducing apparatus; and Fig. 2 is a vertical elevation of the diffraction screen C of Fig. 1.

It will be seen that this screen or grating C is arranged at right angles to the optical axis of the system and so that the diffraction lines are parallel to the linear lenticular elements of the film A to be copied and of the black film D. B is the usual objective.

The distance of the screen C from the films A and D depends on the width of the diffracting elements, but it must be so arranged that the image of the lines of intersection of the lenticular elements of the film A are suitably effaced from the film D. This distance can be determined mathematically by the use of Fresnel integrals, or graphically by the radioid of the cornu arcs. However, it is sufficient to take any commercial screen and merely displace it parallel to itself along the optical axis of the projection system until the image of the network of the original film disappears in the plane of the reproduction film.

I claim as my invention:—

A method of reproducing colored pictures on lenticular films by projection-printing on sensitive lenticular film material with the elimination of color stripes resulting from the image of the reticulation network of the original film, consisting in interposing between the objective and the sensitive lenticular film a diffraction screen having alternate opaque and transparent bands, and displacing said screen parallel to itself until the image of the network of the original film disappears on the plane of the sensitive film.

In testimony whereof I affix my signature.

PAUL BROSSE.